March 2, 1943.  W. FORSTNER  2,312,890
COLLAR HOLDER
Filed April 1, 1941

INVENTOR
William Forstner
BY Nathaniel Frucht
ATTORNEY

Patented Mar. 2, 1943

2,312,890

UNITED STATES PATENT OFFICE 2,312,890

COLLAR HOLDER

William Forstner, Irvington, N. J., assignor to Forstner Chain Corporation, a corporation of New Jersey Application April 1, 1941, Serial No. 386,300

1 Claim. (Cl. 24—81)

The present invention relates to men's jewelry, and has particular reference to the construction of collar holders.

The principal object of the invention is to provide a simplified construction having a holding grip of greater strength.

Another object is to provide a construction which facilitates the application of different ornamental features.

Still another object is to form the parts to permit manufacture from wire or by stamping.

With the above and other objects and advantageous features in view, the invention consists of a novel arrangement of parts more fully disclosed in the detailed description following, in conjunction with the accompanying drawing, and more specifically defined in the claim appended thereto.

It has been found desirable to manufacture a collar holder having increased gripping power, which may be made of wire or stampings, and which may be ornamented in simple but effective fashion. To this end, I provide a collar holder having an upper member formed to provide a recess at each end, the ends being selectively ornamented, and a lower spring member which has pressure nubs adapted to seat within the end recesses to provide a strong collar retaining grip.

Figure 1:
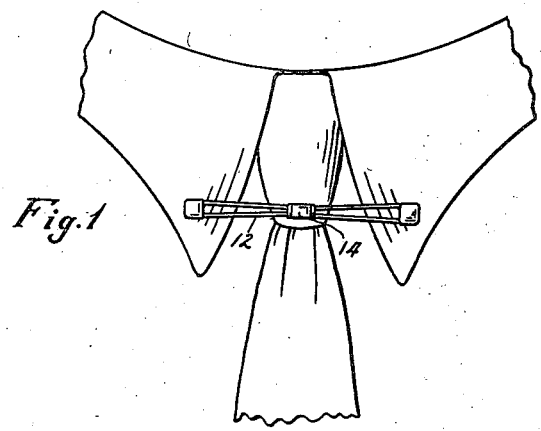
Fig. 1 is a view showing the novel collar holder as in use.
Figure 2:
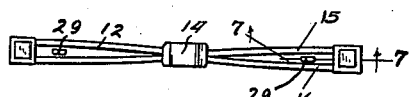
Fig. 2 is a plan view of the collar holder.
Figure 3:
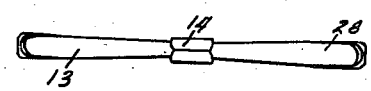
Fig. 3 is a rear view thereof.
Figure 4:
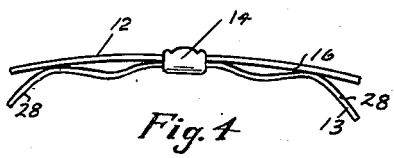
Fig. 4 is a side view thereof.
Figure 5:
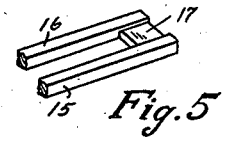
Fig. 5 is an enlarged perspective detail of the rear of one end of the upper member.

Referring to the drawing, the collar holder includes an upper ornamental member 12 and a lower spring member 13 of arcuate shape, see Fig. 4, said members being locked together by a central connector such as a metal band 14. The upper member has two bars 15, 16 diverging from the central portion when connected as illustrated, separated at the ends by a spacer plate 17, which is preferably positioned below the upper surfaces of the bars, see Fig. 5.

Figure 6:
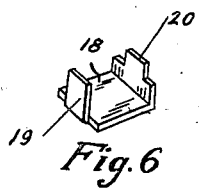
Fig. 6 is a perspective view of one form of ornament therefor.

The spacer plate 17 also functions as a support for an ornament, which may be of various forms, the stamping 18 shown in Fig. 6 having one end terminating in a finger 19 and the opposite end terminating in a finger 20. The stamping is adapted to be positioned with its base above the spacer plate, whereby the two fingers extend around and lock the stamping to the spacer plate, the upper surface of the stamping having a setting 21 for retaining a jewel as shown in Fig. 7.

Figure 8:
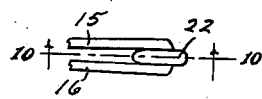
Fig. 8 is an enlarged view of a modified end assembly.
Figure 9:
Fig. 9 is a side view of Fig. 8.
Figure 10:
Fig. 10 is a section on the line 10—10 of Fig. 9.
Figure 11:
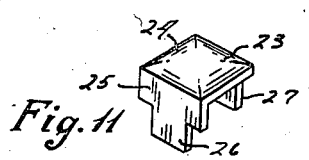
Fig. 11 is a perspective of a modified form of ornament.

If preferred, the ornament may be a thin band 22, see Figs. 8 to 10, which is bent around the spacer plate and soldered or otherwise secured to the rear thereof; or a cap 23, see Fig. 11, may be used, having a head 24 for covering the end of the upper member, an end closure 25 for the ends of the bars 15, 16, and having a lock finger 26 and a second end finger 27, whereby the cap is mounted over the spacer plate and the fingers locked or secured beneath.

Figure 7:
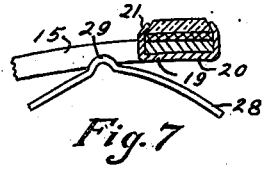
Fig. 7 is an enlarged sectional detail on the line 7—7 of Fig. 2.

The spring member 13 is preferably of double arcuate form, with its ends 28 curved to resiliently press towards the upper member, each end having a nub 29 positioned to be urged to seat in the recess formed between the bars 15, 16, see Fig. 7. This construction provides a strong holding grip for a collar tab, which is readily insertable between the ends of the upper and lower members, and is firmly gripped therebetween.

If desired, the bars 15, 16 may be of wire, with the spacing plates soldered or otherwise secured to the ends thereof; or the upper member may be a stamping of any desired shape and ornamentation, provision being made for a recess or opening at each end to receive the nub 29, which may be formed as a projection of the lower member stock or as a separate part secured thereto.

While I have described a specific constructional embodiment of my invention, it is obvious that changes in the size, shape, and ornamentation of the parts to provide different designs of collar holders may be made within the spirit and the scope of the claim appended herewith.

I claim:

In a collar holder, an upper member comprising two bars, a retainer device securing the central portions of said bars in adjacency, spacer plates at each end for spacing the ends of said bars, whereby two elongated triangular openings are provided and a lower member having its center portion mounted in said retainer device and having its ends resiliently urged upwardly towards the upper member triangular openings, said lower member being of sufficient width to contact the lower surfaces of the upper member, the ends of said lower member each having a nub extending from the upper surface thereof and adapted to extend into the triangular opening of the contiguous upper member end.

WILLIAM FORSTNER.